United States Patent Office 3,752,739
Patented Aug. 14, 1973

3,752,739
RECOVERY OF A CULTIVATED MICRO-ORGANISM AND OF RESIDUAL SUBSTRATE EMPLOYED IN THE CULTIVATION
Jean Amaudric du Chaffaut, Marseille, France, assignor to The British Petroleum Company Limited, London, England
No Drawing. Continuation of abandoned application Ser. No. 743,635, July 10, 1968. This application Nov. 15, 1971, Ser. No. 198,965
Claims priority, application Great Britain, July 19, 1967, 33,088/67
Int. Cl. A23j 1/18
U.S. Cl. 195—28 R   8 Claims

ABSTRACT OF THE DISCLOSURE

Aerobic cultivation of a micro-organism, for example Candida tropicalis, in the presence of a feedstock which consists of or contains a hydrocarbon and on which said micro-organism is capable of growth; thereafter separating part of the aqueous nutrient medium; thereafter treating the remaining product or part thereof comprising the micro-organism in admixture with at least part of the residual hydrocarbon and at least part of the residual nutrient medium, with a surface active agent consisting of or containing a surface active agent having the formula:

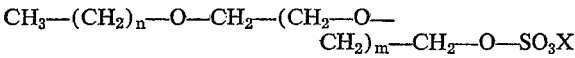

where $n$ is an integer from 11 through to 14 and $m$ is an integer from 4 through to 12 and where X is sodium or potassium, for example an oxyethylenated lauric alcohol sulphate, and thereafter subjecting the mixture so obtained to a separation treatment for the recovery of a fraction in which hydrocarbon predominates and a fraction consisting of or containing a mixture of the micro-organism and water.

Preferably the fraction in which hydrocarbons predominate and which will contain some aqueous medium held in emulsion and comprising surface active agent, is treated with a compound containing a metal ion which forms a water insoluble salt with said surface active agent, for example calcium hydroxide. After removal of the precipitated salt a hydrocarbon product free of surface active agent may be obtained.

This is a continuation of application Ser. No. 743,635, filed July 10, 1968 and now abandoned.

This invention relates to a process for the cultivation and recovery of micro-organisms. This invention also relates to a process for the removal of straight chain hydrocarbons, wholly or in part, from mixtures of said hydrocarbons with other hydrocarbons.

In accordance with the present invention there is provided a process which comprises cultivating a micro-organism, capable of growth on a hydrocarbon in the presence of a feedstock which consists of or contains a hydrocarbon and on which said micro-organism is capable of growth; in the presence of an aqueous nutrient medium and in the presence of a gas containing free oxygen and thereafter separating part of the aqueous nutrient medium; thereafter treating the remaining product or part thereof comprising the micro-organism in admixture with at least part of the residual hydrocarbon and at least part of the residual nutrient medium, with a surface active agent consisting of or containing a surface active agent having the formula:

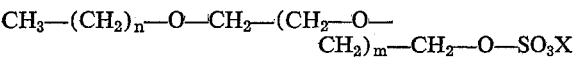

where $n$ is an integer from 11 through to 14 and $m$ is an integer from 4 through to 12 and where X is sodium or potassium and thereafter subjecting the mixture so obtained to a separation treatment for the recovery of a fraction in which hydrocarbon predominates and a fraction consisting of or containing a mixture of the micro-organism and water.

Preferably the fraction in which hydrocarbons predominate and which will contain some aqueous medium held in emulsion and comprising surface active agent, is treated with a compound containing a metal ion which forms a water insoluble salt with said surface active agent. Suitably the compound is an alkaline earth metal. Particularly suitable are calcium and barium compounds. Particularly suitable are calcium and barium hydroxide and salts of these hydroxides, for example the carbonates. Other compounds which may be employed are salts of heavy metals and salts of zinc.

Another preferred method for the treatment of the fraction in which hydrocarbons predominate and which contains some aqueous medium comprising surface active agent held in suspension, comprises treating said fraction with a mineral acid, for example hydrochloric acid or sulphuric acid. Other acids may be employed provided that, under the conditions used, they are capable of hydrolysing the surface active agent. After said treatment free acid, derived from the surface active agent, is separated, in an aqueous fraction, from a hydrocarbon fraction by centrifuging. Preferably the hydrocarbon fraction is washed with water and centrifuged to remove mineral acid.

Another preferred method for the treatment of said fraction in which hydrocarbons predominate is to cool the fraction preferably to a temperature in the range $-10°$ C. to $+10°$ C., suitably $0°$ C., and then centrifuge.

Another preferred method for the treatment of said fraction is to add a solvent, for example 15–25% by wt. of isopropanol, and then centrifuge.

Usually the straight-chain hydrocarbons will be present in the feedstock according to the invention as paraffins; however, the straight chain hydrocarbons may be present as olefins; also there may be used a mixture containing straight chain paraffins and olefins.

Suitably the feedstock is a hydrocarbon fraction derived from petroleum. Preferably the hydrocarbon fraction consists in part of straight chain hydrocarbons having a mean molecular weight corresponding to 10 carbon atoms per molecule.

Suitable feedstocks to the process of the invention include kerosine, gas oils and lubricating oils; these feedstocks may be unrefined or may have undergone some refinery treatment, but will usually contain a proportion of straight chain hydrocarbons in order to fulfil the purpose of this invention. Suitably the petroleum fraction will contain 3–45% by weight of straight chain hydrocarbons.

The process of the invention is of particular value for the treatment of petroleum gas oil fractions which contain straight chain hydrocarbons in the form of waxes, since by the process of the invention a gas oil of improved pour point is obtained while the waxes are converted to a valuable product.

Within the term "micro-organism" used herein we include mixtures of micro-organisms. Preferably the micro-organism is capable of growing on at least some normal paraffins.

Micro-organisms which are cultivated as herein described may be yeasts, moulds or bacteria.

The yeasts in this specification are classified according to the classification system outlined in "The Yeasts, a Taxonomic Study" by J. Lodder and W. J. W. Kreger-Van Rij, published by North Holland Publishing Co. (Amsterdam) (1952).

The bacteria mentioned in this specification are classified according to the classification system outlined in "Bergey's Manual of Determinative Bacteriology" by R. S. Breed, E. G. D. Murray and N. R. Smith, published by Bailliere, Tindall and Cox (London), 7th edition (1957).

Preferably when a yeast is employed this is of the family Cryptococcoceae and particularly of the sub-family Cryptococcoideae however, if desired there may be used, for example, ascosporogeneous yeasts of the sub-family Saccharomycoideae. Preferred genera of the Cryptococcoideae sub-family are Torulopsis (also known as Torula) and Candida. Preferred species of yeast are as follows. In particular it is preferred to use the specific stock of indicated Baarn reference number; these reference numbers refer to CBS stock held by the Centraal Bureau vor Schimmelculture, Baarn, Holland and to INRA stock held by the Institut National de la Recherche Agronomique, Paris, France.

| | Preferred strain |
|---|---|
| Candida lipolytica | |
| Candida pulcherrima | CBS 610. |
| Candida utilis | |
| Candida utilis, Variati major | CBS 841. |
| Candida tropicalis | CBS 2317. |
| Torulopsis colliculosa | CBS 133. |
| Hansenula anomala | CBS 110. |
| Oidium lactis | |
| Neurospora sitophila | |
| Mycoderma cancoillote | INRA: STV 11. |

Of the above *Candida lipolytica* is particularly preferred.

If desired the micro-organism may be a mould. Suitable moulds are Penicillium and preferably there is used *Penicillium expansum*. Another suitable genus is Aspergillus.

If desired the micro-organism may be a bacterium.

Suitably the bacteria are of one of the orders: Pseudomonadales, Eubacteriales and Actinomycetales.

Preferably the bacteria which are employed are of the families Corynebacteriaceae, Micrococcaceae, Achromobacteraceae, Actincymyoetaoeae, Rhizobiaceae, Bacillaceae and Pseudomonadaceae. Preferred species are *Bacillus mageterium, Bacillus subtilis* and *Pseudomonas aeruginosa*. Other species which may be employed include:

*Bacillus amylobacter*
*Pseudomonas natriegens*
Arthrobacter sp.
Micrococcus sp.
Corynebacterium sp.
*Pseudomonas syringae*
*Xanthomonas begoniae*
*Flavobacterium devorans*
Acetobacter sp.
Actinomyces sp.
*Nocardia opaca*

The growth operation will usually be discontinued before a stationary phase is reached. Usually, however, the growth stage will be operated in continuous manner and with continuous removal of a broth. At this stage it will usually be possible to separate the micro-organism, with unmetabolised feedstock and some aqueous nutrient medium, from the bulk of the aqueous nutrient medium. Preferably the separation is achieved by means of a decantation; additionally or alternatively centrifuging may be used. The fraction containing the micro-organism is now subjected to treatment with an aqueous treating medium containing a surface active agent as hereinbefore described.

Preferably the micro-organism fraction is vigorously mixed with the aqueous surface-active agent, and, without a further period of growth of the micro-organism, is subjected to further separation, preferably by centrifuging, to recover a micro-organism fraction, a spent aqueous phase and a residual hydrocarbon phase. If necessary, the washing and separating steps may be repeated, once or more, using an aqueous surface-active agent in the washing stage. After washing with surface-active agent it is necessary to wash with an aqueous medium which is free of surface active agent; preferably this medium will be water. Again if desired, a series of washing and separation stages may be employed.

Preferably the washing stages are carried out until the hydrocarbon content of the micro-organism is less than 7% based on the weight of the micro-organism (as calculated for the dry state). Preferably said content of hydrocarbons will be less than 5%.

As the surface active agent employed for washing there may be used, for example, an anionic detergent consisting of oxyethylenated lauric alcohol sulphate.

The residual hydrocarbon phase which will contain some surface active agent is then treated by one or other of the methods hereinafter described. When the feedstock to the growth stage is a gas oil, there is obtained a hydrocarbon fraction of low wax content and substantially free of the surface active agent used in the treating process herein described.

The invention is illustrated but not limited with reference to the following examples:

EXAMPLE 1

The yeast *Candida tropicalis* was grown in a continuously operated fermenter of 500 litres of working volume (7000 litres capacity) in the presence of an aqueous nutrient medium having the following composition:

| | Grams |
|---|---|
| Di-ammonium hydrogen phosphate | 2 |
| Potassium chloride | 1.15 |
| Magnesium sulphate, heptahydrate | 0.65 |
| Manganese sulphate, tetrahydrate | 0.068 |
| Iron sulphate, heptahydrate | 0.124 |
| Zinc sulphate, heptahydrate | 0.308 |
| Yeast extract | 0.025 |

Tap water added to make up to 1 litre.

The fermenter employed was in the form of a vertical cylindrical vessel containing a co-axial cylindrical director tube, the ratio of cross sectional area of the annular space to the cross sectional area of the interior of the director tube being 1:1, said fermenter being equipped with a propeller.

Aeration was maintained at 60 vol./vol./hour using vortex stirring. The broth was maintained at 30° C. and pH 4 by continuous admission of ammonia.

The carbon source was provided by a gas oil obtained from Middle-East crude petroleum and having the following characteristics:

| | |
|---|---|
| Specific gravity 60° F./60° F. | 0.870 |
| Pour point °C | +15 |
| Boiling range °C | 300–390 |

A mixture of gas oil and aqueous nutrient medium in the relative proportion 1.5/10 parts by volume was fed to the fermenter at a rate of 1000 litres per hour.

A product stream was removed continuously and sent to a decanter. 70% by volume of the decanted phase, consisting of spent aqueous medium was withdrawn. To the remaining 30% consisting of a yeast cream was added 70% fresh water in order to reconstitute the original mixture.

To this reconstituted mixture was added 1.0 gram/litre of an oxyethylenated lauric alcohol sulphate having, on average, 7 ethylene oxide groups per molecule and a sulphur content of 1.4% by wt. and sold under the trade designation B. 6608A.

After stirring the mixture, at 915 kg./hour, was centrifuged with recovery of:

(a) 105 kg./hr. of gas oil phase containing 0.6 gram/litre of yeast (b) 765 kg./hr. of aqueous phase containing 0.2 gram/litre of yeast (c) 45 kg./hr. of a yeast paste containing 90 grams/litre of yeast (on dry basis).

The yeast paste was passed with water to a mixer and the mixture so obtained was centrifuged to obtain: (a) an oil phase, (b) an aqueous phase and (c) a thick yeast cream containing 20% by wt. of yeast (estimated as dry yeast) and 80% by wt. of water and which contained only a very small quantity of oil.

After a subsequent water rinsing followed by centrifuging there was obtained a yeast product containing 65% by weight of water, together trace amounts of hydrocarbon contaminant. By further centrifuging there was obtained an impure yeast cream containing circa 1 part by weight of dry contaminated yeast per 1.5 parts by weight of water.

This yeast cream was then pumped into an extractor which was in the form of a drum filter which was rotated with its axis horizontal. A solvent mixture consisting of 3 parts in volume of IPA and 5 parts in volume of an azeotropic mixture (of which the composition is normal hexane 80% by wt. and isopropyl alcohol 20% by wt.) was poured into the extractor, the volumes of solvent being based on 1 part by volume of dry (contaminated) yeast.

The mixture was maintained at 80° C. for 20 minutes and then the solvent drawn off, finally under vacuum.

A second extraction step was carried out identical to the first.

In a second extraction stage the solid material which was recovered was washed with isopropyl alcohol at a rate of 4 volumes for 1 volume of dry yeast at 50° C. for 90 minutes. The remaining solvents and contaminant were removed. Finally the yeast product was dried in super heated steam.

The gas oil phase in batches of 105 kg. was passed to a vessel to which was added 137 grams of calcium hydroxide. The mixture was stirred for one hour, then centrifuged to give:

96 kg./hr. of pure gas oil (without yeast detergent and water)

8 kg. of water 1 kg. of an emulsion of slaked lime, residual amount of yeast, trace amount of oil, and precipitated detergent.

The gas oil thus obtained was suitable without further treatment for use as a diesel oil.

EXAMPLE 2

The process described in Example 1 was repeated to the stage at which fresh water was added to the decanted yeast cream. To this reconstituted mixture was added 0.7 gram/litre of an oxyethylenated lauric alcohol sulphate having, on average, 7 ethylene oxide groups per molecule and a sulphur content of 1.4% by wt. and sold under the trade designation B. 6608A.

After stirring, this mixture was passed, at the rate of 1000 kg./hour to a centrifuge from which was recovered:

(a) 115 kg./hour of gas oil phase having a residual water content of 0.5% by weight and a yeast content of 0.7 gram/litre (b) 835 kg./hour of an aqueous phase containing 0.2 gram/litre of yeast (c) 50 kg./hour of a yeast paste containing 90 grams/litre of yeast.

The gas oil phase was pumped at 115 kg./hour to a vessel to which was also added 115 kg./hour of an N/50 hydrochloric solution. This mixture was stirred and centrifuged giving 102 kg. of gas oil and 128 kg. of a mixture of water, HCl, yeast and emulsion. The latter mixture was discarded.

EXAMPLE 3

The process described in the Example 2 was repeated except that the hydrochloric solution which was employed was N/25. After centrifuging 110 kg./hour of gas oil was obtained while 120 kg. of the mixture of water with waste material was discarded.

EXAMPLE 4

The process described in the Example 2 was repeated except that the hydrochloric solution which was employed was N/10. After centrifuging 110 kg./hour of gas oil was obtained while the bulk of 120 kg. of the mixture containing acidified water and waste products was discarded.

EXAMPLE 5

The process described in the Example 2 was repeated with a N/2 hydrochloric solution in place of N/50 hydrochloric acid. After centrifuging 111 kg./hour of gas oil was recovered.

EXAMPLE 6

The process described in the Example 2 was repeated with N/5 hydrochloric solution instead of N/50 hydrochloric acid. After centrifuging 113 kg. of pure gas oil was recovered. The remaining 117 kg. containing the hydrochloric solution with waste products was discarded.

EXAMPLE 7

The process described in Example 1 was repeated using the yeast *Candida lipolytica* in place of *Candida tropicalis*. Similar results were obtained.

I claim:

1. A process for the cultivation and recovery of micro-organisms which comprises cultivating a micro-organism, capable of growth on a hydrocarbon, in the presence of a feedstock containing at least as a major proportion thereof a hydrocarbon and on which said micro-organism is capable of growth; in the presence of an aqueous nutrient medium and in the presence of a gas containing free oxygen and thereafter separating part of the aqueous nutrient medium; thereafter treating the remaining product or part thereof comprising the micro-organism in admixture with at least part of the residual hydrocarbon and at least part of the residual nutrient medium, with a surface active agent having the formula:

$$CH_3-(CH_2)_n-O-CH_2-(CH_2-O-CH_2)_m-CH_2-O-SO_3X$$

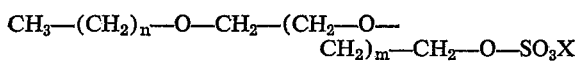

where $n$ is an integer from 11 through 14 and $m$ is an integer from 4 through to 12 and where X is sodium or potassium and thereafter subjecting the mixture so obtained to a separation treatment for the recovery of a fraction containing predominantly hydrocarbon and an aqueous emulsion having the surface active agent present therein and a fraction containing a mixture of the micro-organism and water.

2. A process for the cultivation and recovery of micro-organisms which comprises cultivating a micro-organism, capable of growth on a hydrocarbon, in the presence of a feedstock containing at least as a major proportion thereof a hydrocarbon and on which said micro-organism is capable of growth; in the presence of an aqueous nutrient medium and in the presence of a gas containing free oxygen and thereafter separating part of the aqueous nutrient medium; thereafter treating the remaining product or part thereof comprising the micro-organism in admixture with at least part of the residual hydrocarbon and at least part of the residual nutrient medium, with a surface active agent having the formula:

$$CH_3-(CH_2)_n-O-CH_2-(CH_2-O-CH_2)_m-CH_2-O-SO_3X$$

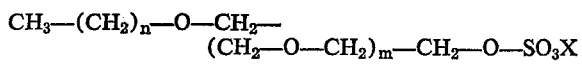

where $n$ is an integer from 11 through 14 and $m$ is an integer from 4 through to 12 and where X is sodium or potassium, thereafter subjecting the mixture so obtained to a separation treatment for the recovery of a fraction containing predominantly hydrocarbon and an aqueous emulsion having the surface active agent present therein and a fraction containig a mixture of the micro-orgaism and water, treating the recovered fraction containing predominantly hydrocarbon and an aqueous emulsion having the surface active agent present therein with a compound containing a metal ion which forms a water insoluble salt with said surface active agent, and thereafter subjecting the mixture to phase separation.

3. A process according to claim 1 in which the recovered fraction containing predominantly hydrocarbon and an aqueous emulsion having the surface active agent present therein is treated with a mineral acid, under conditions such that the surface active agent is hydrolysed, and thereafter subjected to phase separation.

4. A process according to claim 2 in which the compound is an alkaline earth metal.

5. A process according to claim 4 in which the compound is a calcium or barium compound.

6. A process according to claim 5 in which the compound is calcium hydroxide, barium hydroxide, calcium carbonate or barium carbonate.

7. A process in accordance with claim 1 wherein the surface active agent is oxyethylenated lauric alcohol sulphate.

8. A process in accordance with claim 2 wherein the surface active agent is oxyethylenated lauric alcohol sulphate.

References Cited

UNITED STATES PATENTS

| 3,186,922 | 6/1965 | Rhampagnat | 195—82 X |
| 3,522,147 | 7/1970 | Filosa | 195—28 R |

OTHER REFERENCES

McCutcheon, Detergents and Emulsifiers Annual, June 19, 1967, p. 88.

Berkman et al.: Emulsions and Foams, 1941, Reinhold Publ. Corp., New York, pp. 285–293.

JOSEPH M. GOLIAN, Primary Examiner

UNITED STATES PATENT OFFICE
CERTIFICATE OF CORRECTION

Patent No. 3,752,739     Dated August 14, 1973

Inventor(s) Jean Amaudric du Chaffaut

It is certified that error appears in the above-identified patent and that said Letters Patent are hereby corrected as shown below:

Column 4, line 29, "500" should read -- 5000 --;

Column 7, line 4, "containig" should read -- containing --;

Column 7, line 4, "micro-orgaism" should read -- micro-organism --; and

Column 8, line 11, "Rhampagnat" should read -- Champagnat --.

Signed and sealed this 20th day of November 1973.

(SEAL)
Attest:

EDWARD M. FLETCHER, JR.
Attesting Officer

RENE D. TEGTMEYER
Acting Commissioner of Patents